Dec. 30, 1952 E. P. G. WRIGHT 2,623,951

VOICE FREQUENCY SIGNALING SYSTEM

Filed April 28, 1948 3 Sheets-Sheet 1

Inventor

E. P. G. WRIGHT

By Philip M. Bolton

Attorney

Dec. 30, 1952 E. P. G. WRIGHT 2,623,951

VOICE FREQUENCY SIGNALING SYSTEM

Filed April 28, 1948 3 Sheets-Sheet 2

Inventor

E. P. G. WRIGHT

By Philip M. Bolton

Attorney

Dec. 30, 1952 E. P. G. WRIGHT 2,623,951

VOICE FREQUENCY SIGNALING SYSTEM

Filed April 28, 1948 3 Sheets-Sheet 3

Inventor

E. P. G. WRIGHT

By Philip M. Bolton

Attorney

Patented Dec. 30, 1952 2,623,951

UNITED STATES PATENT OFFICE 2,623,951

VOICE FREQUENCY SIGNALING SYSTEM

Esmond Philip Goodwin Wright, London, England, assignor to International Standard Electric Corporation, New York, N. Y., a corporation of Delaware Application April 28, 1948, Serial No. 23,842
In Great Britain May 9, 1947

9 Claims. (Cl. 179—27)

This invention relates to voice frequency signalling systems and has for its object improved means for ensuring release of long distance tandem connections.

The invention will be described with reference to one embodiment shown in the accompanying drawings in which:—

Fig. 2 shows sufficient of the circuits at exchange A on an operator hold basis to illustrate the invention, while

Figure 1:
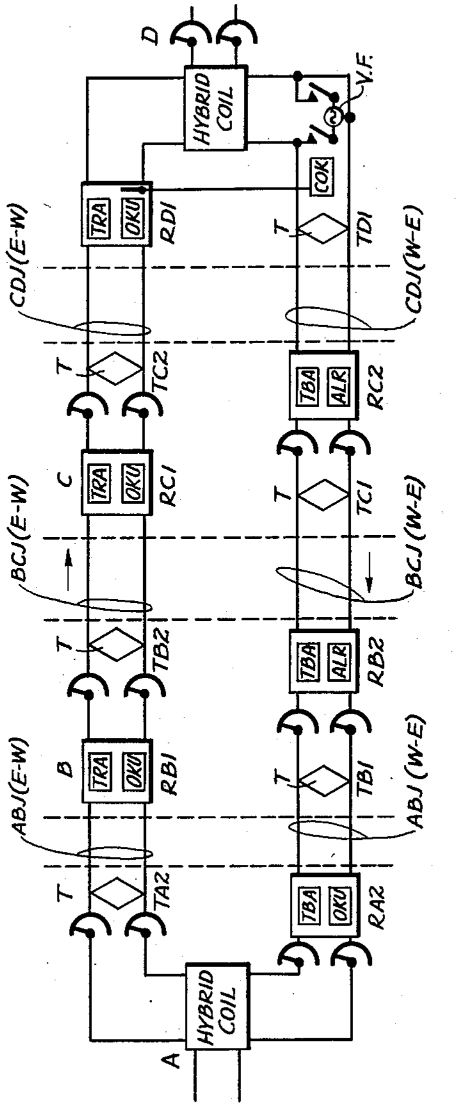
Fig. 1 shows an international or long distance telephone connection from an outgoing long distance exchange A via four wire paths and intermediate exchanges B and C to an incoming long distance exchange D.

Referring first to Fig. 1 the four wire paths are provided with voice frequency signalling equipment individual to each channel or one way path, transmitting and receiving equipment TA2, RA2 at exchange A and TB1, RB1, at exchange B for the four wire paths between A and B, TB2RB2, at exchange B and TC1RC1 at exchange C for the four wire path between B and C; TC2, RC2 at exchange C and TD1, RD1 at exchange D for the four wire path between exchanges C and D.

It is standard practice to arrange that signal receiving equipment used at an intermediate or transit point in a tandem connection shall assume a "transit" condition when a connection has been set up, this condition being such that the equipment will ignore all signals over the connection other than the release signal which as is well known, may be a special audio frequency current, and to which the release control relays are tuned for selective response; and that the paths to and from tandem exchanges are of course, through-connected so that speech and voice frequency signals pass from one end of the four wire connection to the other. The manner of extending a talking connection from the East exchange A to the West exchange B and vice versa, is well known in the art, and forms no particular feature of novelty in the present disclosure. As will be explained hereinbelow in connection with the detailed circuits of Figs. 2 and 3, the exchange A is connected for transmission to the West exchange D by the East-West line shown in the top portion of Fig. 1; and exchange A is connected to exchange D for reception over the West-East line shown at the bottom portion of Fig. 1. The usual hybrid connections are used to segregate the two oppositelydirected transmissions. The transmission junction from A to B includes the tuned forward-release relay TRA, and the receiving junction from B to A includes the tuned backward-release relay TBA as well as an associated alarm relay ALR. Likewise, the transmitting junction between B and C includes a similar tuned forward-release relay TRA, and the receiving junction from C to B includes a similar tuned backward-release relay TBA and alarm relay ALR. Each of the succeeding junctions includes similar forward-release, backward-release and alarm relays. The arrangement is such that when a tuned forward-release relay TRA in any junction is operated, it does not cause the operation of the associated alarm relay or the transmission of an alarm signal back to the calling end at exchange A, unless the corresponding backward release relay TBA at the said junction has not in the meanwhile operated within a predetermined time interval after the operation of its associated relay TRA.

Figure 3:
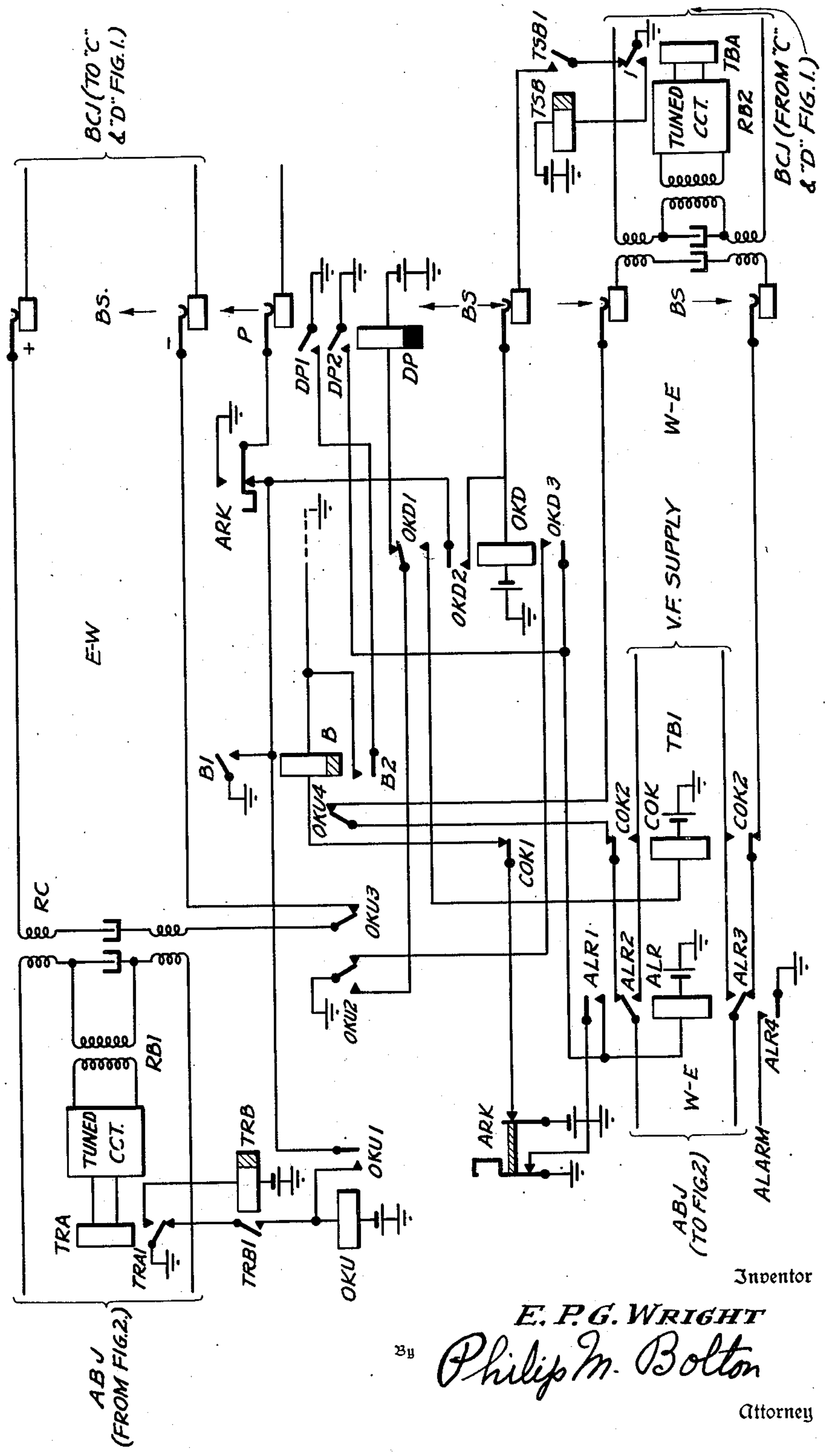
Fig. 3 shows sufficient of the signal transmitting and receiving circuits at exchange B on an operator hold basis to illustrate the invention.

Fig. 3 shows in detail the circuits interrelating the forward and backward release controls for one junction which is typical of all the junctions. Each junction is provided with the usual slow-to-release guard relay (relay B Fig. 3) which, as long as it is operated, maintains a busy and switch-holding ground on the private wire P of the extended connection. For a detailed description of the manner in which the various circuits and switches of an extended telephone connection can be "held" during the talking connection, and can be automatically released when the private wire-holding ground is disconnected, reference may be had to chapter 12 in the book entitled "Automatic Telephony" by A. B. Smith, published 1921 by McGraw-Hill Book Co.

Thus when the connection from A to D has been set up, the signal receivers RB1, RC1, RC2, RB2, will assume the transit condition so that supervisory signals other than the special release signal will pass direct from TA2 to RD1 without affecting RB1 and RC1, and from TD1 to RA2 without affecting RC2 and RB2.

The circuits at B and C are arranged so that when the release signal is received the through connection is broken (by relay OKU Fig. 3) so that voice frequency signals no longer pass from an incoming path to an outgoing path and release of the connection at the exchange in question is initiated. If however, due to some fault a receiver at an intermediate exchange does not respond to the release signals, then the connection at that point will not take place and ensuing calls will be interfered with.

It is proposed therefore to provide checks on the correct operation of the signalling equipment at intermediate exchanges.

The connection will be assumed to work with "calling party" release. If the called party releases first a backward release signal will be sent from TD1 but this will be such that RC2 and RB2 will not respond although RA2 will respond. RA2 will send back the usual signals over the two wire local or national portion of the connection to advise that the calling party has released.

This signal is used to advise an operator in semi-automatic working that the called end of a connection is released: in subscriber dialling it usually has no function.

When the calling party has released, TA2 will send a forward release signal to which RB1, RC1, and RD1 should all respond.

Two cases will now be considered, (*a*) non-operator hold in which each exchange is only concerned with correct operation of its own equipment, (*b*) operator hold, in which the originating exchange needs to know that the whole connection is releasing correctly.

(*a*) *Non-operator hold*

On response to the forward release signal, RB1 and RC1 cause the through connection to be split and also cause TB1 and TC1 respectively to send a backward signal; different from the "called party" release signal; to which RA2 and RB2 should respond. Response of RD1 also causes the same backward signal to be sent by TD1. RA2 will recognise by receipt of this signal from TB1 that release is taking place normally at exchange B and will allow release at exchange A to proceed normally.

If at exchange B, RB1 operates in response to the forward-release signal but RB2 does not receive or respond to the backward signal from TC1 in a predetermined time, a local alarm will be given. If RB1 has not responded to a forward release signal but RB2 receives and responds to the backward signal from TC1 due to receipt of the release signal by RC1, then TB1 will send back to exchange A a characteristic prolonged backward signal; a local alarm can also be given at exchange B.

If RA2 at exchange A receives the said prolonged backward signal it will hold up release of the outgoing long distance circuit and will give an alarm.

Similarly if RA2 receives no backward signal within a predetermined time after TA2 sends the forward release signal release at A will be held up and an alarm given.

It is at present preferred to provide means that will cause TB1 or TC1 to send a prolonged backward signal when RB2 or RC2 responds to the backward signal, these means being disabled by the operation of RB1 or RC1.

If RC1 responds to the forward release signal but RC2 does not respond to the consequent backward signal from TD1 or there is no backward signal from TD1 a local alarm will be given after a predetermined time.

If RC1 does not respond to forward release but RC2 responds to the backward signal from TD1, then a prolonged backward signal is sent by TC1 to RB2 and a local alarm is given. Receipt of a prolonged backward signal by RB2 prevents release of the four-wire circuit between B and C and gives an alarm.

If RB1 does not operate and RC1 does, the backward signal from TC1 will operate RB2 and RA2 as the connection is not split at B.

The four-wire circuit between A and B is not released until the termination of the backward signal received, and operation of RB2 with RB1 unoperated, causes the backward signal received by RA2 to be prolonged to prevent release of the AB circuit and to give an alarm.

(*b*) *Operator hold*

The forward release signal as before should operate RB1, RC1, RD1, but the operation of RB1 or RC1 prepares the transmitter TB1 or TC1 in the return channel to transmit a backward signal when RB2 or RC2 is operated. RD1 causes TD1 to transmit a backward signal, receipt of which by RC2 causes TC1 to transmit the backward signal to RB2 which causes TB1 to transmit the signal to RA2.

If at C or B the backward signal is not repeated, non-receipt thereof at B and A or at A causes an alarm to be given.

If RC1 does not respond to forward release, the connection will not be split at C and its corresponding backward transmitter TC1 will not be conditioned to repeat the backward signal. The backward signal from TD1 will therefore operate both RC2 and RB2, but RC2 will cause TC1 to send a prolonged backward signal which will be received by RB2 which will in turn cause TB1 to send a prolonged signal and the connection will be held.

If RB1 does not respond to a forward signal, the backward signal repeated by TC1 will operate RB2 and RA2 but RB2 with RB1 not operated will cause TB1 to send a prolonged back signal so that the connection is held at A and an alarm given.

It will be seen therefore that at a transit exchange receipt of the forward clear signal causes the signalling circuit in the backward direction to be taken out of the transit condition. It is also proposed that the signalling circuits on a through connection depend on a signal from each direction in order to release both the lines used for the connection.

Arrangements at a transit exchange are envisaged in which a backward release signal will release the forward line but will not allow the backward line to be released.

Further if a transit condition is set up at an exchange an alarm is given if both a forward clear and a backward clear are not received.

Figure 2:
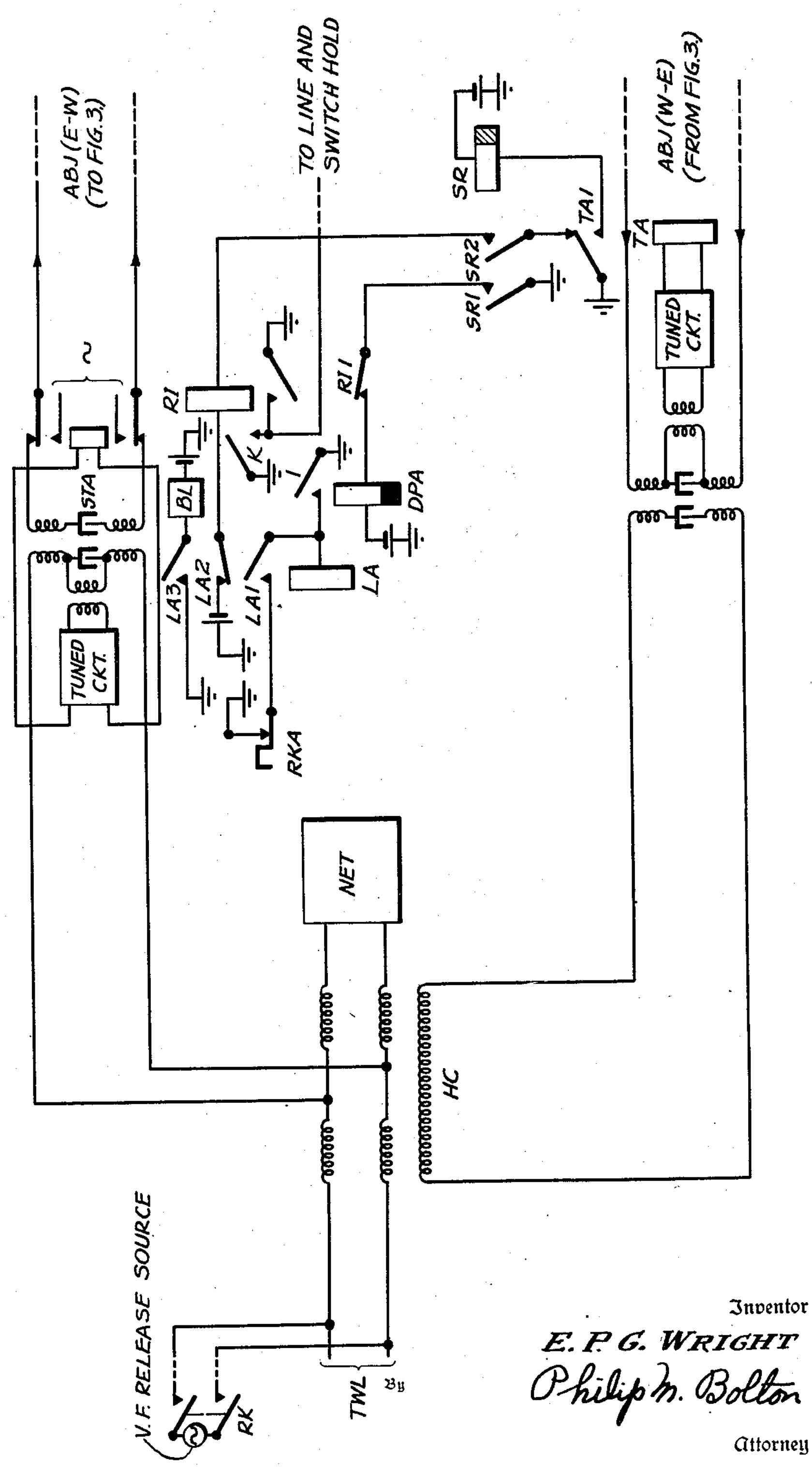

Referring now to Fig. 2, the two wire line TWL seized by a local subscriber of exchange A is connected in well known manner via a hybrid coil HC with its network NET to an outgoing four-wire junction ABJ to exchange B.

The call will be set up in any known manner and when release is to be initiated at exchange A a relay STA is energised to transmit the characteristic V. F. release signal over E—W portion of ABJ. For example the relay STA may be provided with an operating circuit under control of a release key RK which when operated connects the winding of relay STA to the line conductors TWL and by a special character of current, for example reverse polarity, special frequency, or the like, causes relay STA to operate. When relay STA operates, the characteristic forward-release signal is transmitted to the succeeding exchanges B, C and D at which it operates the corresponding forward-release relay TRA. At exchange D this characteristic release frequency operates the relay TRA which in turn operates a relay COK which causes the transmission back to exchange C of the characteristic release frequency. In other words, the characteristic release signal is transmitted back from exchange D to exchange C independently of the hybrid junction.

When a return signal is received via ABJ (W—E) relay TA is operated and in turn operates slow release relay SR. Contacts *sr1* close an energising circuit via back contacts *ri1* for slow-to-operate relay DPA which does not yet operate.

If now the return signal terminates in a predetermined time, relay TA releases and relay RI energises via *sr2* front, *ta1* back and initiates release in any known manner. For a detailed description of the manner in which the release relay RI controls the release of the equipment at exchange A, reference may be had to pages 57–70 of "Automatic Telephony" by A. B. Smith, published 1921 by McGraw-Hill Book Co. Contacts *ri1* are opened, breaking the energising circuit of slow-to-operate relay DPA which has not operated.

If the signal is prolonged, the above-described circuit for relay DPA is closed long enough and relay DPA will finally operate, in turn operating relay LA. Relay LA locks via *la1* front to a release key RKA and via *la2* opens the circuit of RI which is therefore not allowed to initiate release. Earth via contacts *la3* operates a local warning BL.

Relays SR and DPA release.

When an Attendant in response to the warning, operates key RKA, the warning is terminated, and relay LA is released.

After arranging for the fault causing the warning to be cleared, the Attendant will free the junction ABJ for example by operating key K, this key sets up the same release condition as the operation of relay RI. Fig. 3 shows sufficient of the circuits to illustrate the invention. The incoming E—W portion of the ABJ junction (exchange A to exchange B) is connected via a repeat coil RC to wipers of the connecting switch BS and a VF receiving circuit RB1 is connected to the repeating coil. The outgoing junction BCJ is connected to contacts of switch BS. The W—E portion of junction ABJ is also connected to wipers of switch BS and is adapted to be connected for signal transmission to a voice frequency transmitter TB1. The incoming end of the W—E portion of junction BCJ is provided with a voice frequency receiver RB2. The outgoing end of the E—W portion of BCJ will be provided with signal transmittng equipment but this forms no part of the present invention and is therefore not shown.

A release signal from exchange A incoming over the E—W portion of junction ABJ operates relay TRA via the tuned circuit of the receiver RB1. Earth via front contact *tra1* operates relay TRB which is slow releasing. At the end of the release signal relay TRA releases and via back contact *tra1* and front contact *trb1* relay OKU is operated. Contact *oku3* opens the outgoing E—W circuit via switch BS and BCJ. By delaying the opening of the junction until the end of the release signal, it is ensured that the release signal shall have an opportunity of being effective at each exchange throughout the connection. Relay OKU locks via front contact *oku1* and front contact *b1*. Relay B is the usual guard relay of the circuit; it is normal practice to provide any such circuit with a B relay which is operated when the circuit is taken into use via a circuit not shown in detail but indicated by a dotted line and which maintains a busy condition on the circuit until the circuit is released.

Earth via front contacts *oku2* and back contacts *okd1* energises slow operating relay DP. Relay DP may be of the dash pot type and will take a predetermined time to operate.

Meanwhile, assuming that release has taken place normally in the succeeding portion of the connection, a return signal will be received over the W—E circuit of junction BCJ and via the tuned circuit of the signal receiving equipment RB2 will operate TBA. Earth via contacts TBA1 operates relay TSB. At the end of the return signal TBA releases and earth via *tba1* back, TSB1 front and an additional wiper of switch BS operates relay OKD which locks via *okd2* to *b1*. Back contacts *okd1* open the energising circuit for slow-to-operate relay DP before it has fully energised.

Earth via *oku2* front and *okd1* front now operates relay COK which connects a VF signal via its front contacts *cok2*, *cok3* and back contacts *alr2*, 3, to the W—E portion of junction ABJ. The operation of both of the relays OKU and OKD has proved that release ahead of exchange B is correct and that release of exchange B is proceeding. It will be seen that guard relay B has its circuit via a back contact 1 of relay COK so that when COK operates the hold circuit for relay B will be opened and relay B will release slowly.

When relay B fully releases it opens the holding circuits for relays OKU and OKD which release followed by relay COK and the signal back to exchange A is terminated. It has been timed by the release of relay B.

It will be remembered that relay OKU which operated to the incoming release signal from exchange A closes a circuit for slow-to-operate relay DP. If relay DP finally operates before a signal is received via the W—E circuits of BCJ, earth via *dp2* will operate alarm relay ALR which connects up the voice-frequency signal supply to the W—E circuit of ABJ via *alr2*, 3 front. Relay ALR locks via *alr1* and an alarm reset key ARK. Earth via *alr4* front operates a local alarm. Earth via front contacts *dp1* and *b2* holds relay B.

The alarm signal will continue until an attendant seeing or hearing the local alarm operates key ARK and opens the locking circuit for relay ALR. The alarm signal via ABJ is a long signal and will be recognised at exchange A as such.

Operation of key ARK opens the circuit of relay B which releases followed by release of relays OKU, DP, ALR, and the alarm signal ceases.

If, when relay OKD operates, relay OKU has not been operated then earth via *oku2* back, *okd3* front operates relay ALR and as before an alarm signal is sent to exchange A and a local alarm is given.

Instead of both fault conditions operating relay ALR to send back an alarm signal to exchange A, the alarm signal could be sent back in the case when OKD only operates but not OKU, while operation of DP due to non operation of OKD could be arranged to operate a local alarm only.

It will be noted that operation of relay OKU opens its contact *oku4* to open the W—E transmission line between the V. F. transmitter TB1 and the V. F. receiver RB2.

At exchange A as previously described the receipt of a return V. F. signal from B will operate timing equipment so arranged that if the signal terminates after a predetermined time, release of the junction ABJ will be initiated while if the signal is prolonged, the junction will be held and an alarm given.

At exchange D the receipt of the release signal over CDJ (E—W) on a relay such as OKU, Fig. 3 will directly cause the transmission back over CDJ (W—E) of an acknowledgement signal by means of a relay such as COK, Fig. 3, without going through a tuned backward release relay as shown in Fig. 3. Thus for this condition at exchange D contact OKD1 in the COK relay circuit will be permanently closed.

Of course, the circuits of Fig. 3 could easily be modified so that a short acknowledge signal is sent when relay OKU alone operates without waiting for operation of relay OKD.

What is claimed is:

1. A voice frequency signalling system comprising two terminal stations and at least one intermediate repeater station, one of said terminal stations comprising means for transmitting and receiving a release signal, alarm equipment and means responsive to the receipt of a release signal for operating said alarm equipment after a predetermined interval of time, the other of said terminal stations comprising means for receiving and transmitting a release signal and said repeater station comprising means for receiving and transmitting said release signals from said terminal stations and means for terminating said release signal transmission a predetermined interval of time after receipt of a release signal which is shorter than said first mentioned predetermined time interval.

2. A voice frequency signalling system according to claim 1 wherein said release signal is a signal of a predetermined frequency and said one station and said repeater comprise means for selecting said signal and for energizing respectively said operating means and said terminating means.

3. A voice frequency signalling system according to claim 1 wherein said repeater further comprises means responsive to receipt of a release signal from said one terminal for transmitting an alarm signal to said one terminal a predetermined time interval after receipt of said signal and means responsive within said last-mentioned time interval to receipt of a release signal from said other terminal station for preventing transmission of said alarm signal.

4. A voice frequency signalling system according to claim 3 wherein said repeater further comprises alarm equipment and said responsive means in said repeater comprises means for operating said last-mentioned alarm equipment when an alarm signal is transmitted to said one terminal.

5. An alarm arrangement for a voice frequency system of the kind having forward and backward transmission lines interconnecting two points, comprising means to transmit a characteristic-frequency supervisory signal over the forward line and also over the backward line, an alarm, means to operate said alarm when the backward signal does not arrive within a predetermined interval subsequent to its forward transmission, and other means effective when said backward signal arrives within said interval to prevent the operation of said alarm.

6. In a voice frequency signal system of the kind having a series of tandem-connected sections, means controlled by the calling end for transmitting a characteristic release signal in a forward direction through all the tandem sections, means to transmit a characteristic release signal backward from said called end in tandem through said sections to the calling end, alarm control means at one of said sections to give an alarm when the backward transmitted release signal does not arrive thereat within a predetermined interval subsequent to its forward transmission, and other means effective when said backward signal arrives within said interval to prevent the operation of said alarm.

7. A voice frequency signal system according to claim 6, in which said release signal is of a predetermined frequency, and the said alarm control means includes a relay which is selectively responsive to said forward transmitted signal, and said other means includes another relay which is selectively responsive to said backward signal transmission.

8. A system for voice frequency signalling between a calling point and a called point and including a plurality of signal repeaters one for repeating signals only from the calling point to the called point, the other for repeating signals only from the called point to the calling point, alarm equipment, means to transmit a characteristic supervisory signal through said repeaters in tandem, alarm means associated with the first of said repeaters, and means responsive when the said signal does not arrive at said second repeater within a predetermined time after its receipt at the first repeater to operate said alarm.

9. A system for voice frequency signalling between a calling point and a called point and including a plurality of signal repeaters one for repeating signals only from the calling point to the called point and the other for repeating signals only from the called point to the calling point, alarm equipment, means to transmit a characteristic supervisory signal through the first repeater, means responsive to the receipt of said supervisory signal at the called end to transmit back to the other repeater another characteristic supervisory signal, alarm means associated with said repeaters, and means responsive when the said other signal does not arrive at the second repeater within a predetermined time after the first signal leaves the first repeater to operate said alarm.

ESMOND PHILIP GOODWIN WRIGHT.

REFERENCES CITED

The following references are of record in the file of this patent:

UNITED STATES PATENTS

| Number | Name | Date |
|---|---|---|
| 1,684,422 | Toomey | Sept. 18, 1928 |
| 1,733,466 | Nelson | Oct. 29, 1929 |
| 1,899,112 | Saunders | Feb. 28, 1933 |
| 1,912,450 | Hatton | June 6, 1933 |
| 2,068,293 | Illgenfritz | Jan. 19, 1937 |
| 2,095,688 | Ballentine | Oct. 12, 1937 |
| 2,233,282 | Buchanan | Feb. 25, 1941 |
| 2,249,931 | Barney | July 22, 1941 |
| 2,278,172 | Dimond | Mar. 31, 1942 |